United States Patent
Jen et al.

(10) Patent No.: US 8,812,924 B2
(45) Date of Patent: Aug. 19, 2014

(54) METHOD OF HANDLING A DAMAGE INFORMATION-ASSISTED HYBRID ARQ SCHEME AND RELATED COMMUNICATION DEVICE

(75) Inventors: Yu-Chih Jen, Taoyuan County (TW); Ping-Cheng Yeh, Taipei (TW); Chih-Yao Wu, Taipei (TW); Pang-Chang Lan, Taipei (TW); Ling-San Meng, Taipei (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 147 days.

(21) Appl. No.: 13/165,781

(22) Filed: Jun. 21, 2011

(65) Prior Publication Data

US 2012/0159278 A1 Jun. 21, 2012

Related U.S. Application Data

(60) Provisional application No. 61/357,113, filed on Jun. 22, 2010.

(51) Int. Cl.
*H04L 1/18* (2006.01)

(52) U.S. Cl.
CPC .............. *H04L 1/18* (2013.01); *H04L 1/1816* (2013.01); *H04L 1/1812* (2013.01)
USPC .......................................... 714/748; 714/746

(58) Field of Classification Search
CPC ....... H04L 1/89; H04L 1/1809; H04L 1/1812; H04L 1/1887; H04L 1/1819; H04L 1/1845; G06F 11/10; G06F 11/14
USPC .......................................... 714/751, 748, 758
See application file for complete search history.

(56) References Cited

U.S. PATENT DOCUMENTS

| | | | | |
|---|---|---|---|---|
| 7,733,913 | B1 * | 6/2010 | Cheung et al. | 370/474 |
| 8,050,247 | B2 * | 11/2011 | Kim et al. | 370/349 |
| 8,347,163 | B2 * | 1/2013 | Zheng | 714/748 |
| 8,365,051 | B2 * | 1/2013 | Chun et al. | 714/780 |

(Continued)

FOREIGN PATENT DOCUMENTS

| | | |
|---|---|---|
| CN | 101286825 A | 10/2008 |
| CN | 101296165 A | 10/2008 |
| WO | 0021236 | 4/2000 |
| WO | 2004075023 A2 | 9/2004 |

OTHER PUBLICATIONS

L.R. Bahl J. Cocke, F.Jelinek, and J.Raviv;Optimal decoding of linear codes for minimizing symbol error rate;1974;IEEE; pp. 284-287 vol. 20.*

(Continued)

*Primary Examiner* — Albert Decady
*Assistant Examiner* — Osman Alshack
(74) *Attorney, Agent, or Firm* — Winston Hsu; Scott Margo (57) ABSTRACT

A method of handling a retransmission of a hybrid automatic repeat request scheme for a receiver in a communication system is disclosed. The method comprises receiving a first payload from a transmitter in the communication system, and feeding back a resource index to the transmitter, to indicate a size for a second payload in the next reception, when the receiver is unsuccessful to decode the first payload into a plurality of information bits, wherein the transmitter encodes the plurality of information bits into the first payload by using an error correction code.

7 Claims, 5 Drawing Sheets

(56) References Cited

U.S. PATENT DOCUMENTS

| | | | |
|---|---|---|---|
| 8,369,278 B2 | 2/2013 | Wang | |
| 2003/0212951 A1* | 11/2003 | Kim et al. | 714/799 |
| 2003/0217319 A1* | 11/2003 | Tripathi et al. | 714/751 |
| 2005/0022097 A1 | 1/2005 | Cheng | |
| 2007/0071140 A1* | 3/2007 | Sontowski | 375/341 |
| 2007/0183541 A1* | 8/2007 | Moorti et al. | 375/341 |
| 2008/0212541 A1* | 9/2008 | Vayanos et al. | 370/335 |
| 2008/0225783 A1* | 9/2008 | Wang et al. | 370/329 |
| 2009/0213876 A1* | 8/2009 | Wang et al. | 370/471 |
| 2009/0274139 A1* | 11/2009 | Palanki | 370/349 |
| 2010/0005357 A1* | 1/2010 | Sun et al. | 714/749 |
| 2010/0067598 A1* | 3/2010 | Sampath et al. | 375/262 |
| 2010/0146355 A1 | 6/2010 | Jiang | |
| 2011/0019568 A1* | 1/2011 | Kim et al. | 370/252 |
| 2011/0044243 A1* | 2/2011 | Yi et al. | 370/328 |
| 2011/0228756 A1* | 9/2011 | Kim et al. | 370/338 |
| 2012/0057545 A1* | 3/2012 | Hariharan et al. | 370/329 |

OTHER PUBLICATIONS

Hangenauer, Joachim;Rate- compatile punctured convolutional codes(RCPC codes); 1988; IEEE; pp. 389-400; vol. 36.*

David Chase, "A Combined Coding and Modulation Approach for Communication over Dispersive Channels", Mar. 1973, p. 159-174, vol. COM-21, No. 3, IEEE Transactions on Communications.

Arnab Das et al., "A$^2$IR: An Asynchronous and Adaptive Hybrid ARQ scheme for 3G Evolution", 2001, p. 628-632, vol. 1, IEEE.

Bartosz Mielczarek et al., "Adaptive Hybrid ARQ Systems With BCJR Decoding", May 2008, p. 1606-1619, vol. 57, No. 3, IEEE Transactions on Vehicular Technology.

Martin Döttling et al., "Incremental Redundancy and Bit-Mapping Techniques for High Speed Downlink Packet Access", 2003, p. 908-912, vol. 2, IEEE.

Hanjo Kim et al., "New Turbo-ARQ Techniques Based on Estimated Reliabilities", 2003, p. 843-848, vol. 2, IEEE.

Ahmad Gomaa et al., "Novel Reliability-Based Hybrid ARQ Technique", 2009, p. 1-6, IEEE.

Wang, Wei-Chen, "Payload Damage Estimation for Hybrid ARQ", Jul. 2007, cover page+p. 1-74. Abstract.

3GPP TR 36.814 V9.0.0 (Mar. 2010) Technical Report 3rd Generation Partnership Project; Technical Specification Group Radio Access Network; Evolved Universal Terrestrial Radio Access (E-UTRA); Further advancements for E-UTRA physical layer aspects (Release 9).

European patent application No. 11005029.1, European Search Report mailing date: Nov. 4, 2011.

Office action mailed on Jul. 12, 2013 for the China application No. 201110169774.3, filed Jun. 22, 2011, p. 1-11.

* cited by examiner

METHOD OF HANDLING A DAMAGE INFORMATION-ASSISTED HYBRID ARQ SCHEME AND RELATED COMMUNICATION DEVICE

CROSS REFERENCE TO RELATED APPLICATIONS

This application claims the benefit of U.S. Provisional Application No. 61/357,113, filed on Jun. 22, 2010 and entitled "Methods and Apparatus for Damage Information-assisted Hybrid ARQ Scheme", the contents of which are incorporated herein in their entirety.

BACKGROUND OF THE INVENTION

1. Field of the Invention

The present invention relates to a method used in a communication system and related communication device, and more particularly, to a method of handling a damage information-assisted hybrid ARQ scheme in a communication system and related communication device.

2. Description of the Prior Art

An automatic repeat request (ARQ) scheme is used between a transmitter and a receiver in a communication system to provide reliable data transmission. For example, when the ARQ scheme is used, a packet is transmitted with redundant bits generated by an error detection code (EDC) (e.g. a cyclic redundancy check (CRC) code) by the transmitter to the receiver. After the receiver receives the packet with the redundant bits, the receiver checks correctness of the packet by using the EDC. If the packet is received without any error, the receiver feedbacks an acknowledgment (ACK) to inform the transmitter that the packet has been received correctly. After the transmitter receives the ACK, the transmitter can continue to transmit successive packets. Oppositely, if the packet is received with an error, the receiver feedbacks a negative acknowledgment (NACK) to inform the transmitter that the packet has not been received correctly. After the transmitter receives the NACK, the transmitter retransmits the packet until an ACK is received.

However, the reliable data transmission using the ACK scheme is inefficient. For example, there is a great opportunity that the packet is received with small errors (e.g. a small number of error bits) and it is not necessary to retransmit the whole packet such that resources of time, frequency and/or code are wasted. In this situation, if an error correction code (ECC) (e.g. a convolutional code) is used, the packet can easily be corrected and the resources are saved. Therefore, a number of feeding back the NACK and retransmission can be reduced. A hybrid automatic repeat request (HARQ) scheme is proposed based on this concept.

The HARQ scheme is used in the communication system to provide both efficient and reliable data transmissions. Different from the ARQ scheme, both the EDC and the ECC are used in the HARQ scheme. For example, when the HARQ scheme is used, the transmitter encodes the packet into a payload by using the EDC and the ECC, and transmits the payload to the receiver. After the receiver receives the payload, the receiver decodes the payload into a decoded packet by using the ECC and checks the decoded packet by using the EDC. If the decoded packet is correct without any error, the receiver feedbacks an ACK to inform the transmitter that the packet has been received correctly. Oppositely, if there is an error with the decoded packet, the receiver feedbacks the NACK to the transmitter. Since the packet with the small errors can be correctly decoded by using the ECC without feeding back the NACK, i.e., requesting a retransmission, throughput of the communication system is increased due to fewer retransmissions.

Furthermore, there are three types of the HARQ scheme: type-I, type-II and type-III schemes. In the type-I HARQ scheme, a receiver decodes a newly retransmitted payload and discards the payloads of the previous receptions. Therefore, information in the payload of the previous transmission is not exploited, and performance loss is caused. In the type-II and type-III HARQ schemes, the receiver combines the newly retransmitted payload and the payloads of the previous receptions to perform a joint decoding. Therefore, comparing with the type-I HARQ scheme, performances of the type-II and type-III HARQ schemes are improved due to a combination of the payloads. Besides, there are two methods for performing the combination: chase combining (CC) and incremental redundancy (IR). When using the chase combining, the same payload is transmitted in a retransmission. When using the incremental redundancy, a different part of the payload with a fixed size is transmitted in the retransmission. It has been shown that performance of the incremental redundancy is better than performance of the chase combining.

However, the performance of the incremental redundancy is limited due to the fixed size of the retransmitted payload. In detail, an amount of errors in the decoded packet is different in each retransmission. Accordingly, amounts of redundant bits and information of the packet required in the retransmitted payload for the receiver to perform the joint decoding successfully are also different. In this situation, the fixed size of the retransmitted payload may be excessive or insufficient for accommodating the amounts of redundant bits and information of the packet. Not only the resources may be wasted when the fixed size is too large, but more retransmissions may be needed when the fixed size is too small. Therefore, there is a room to improve the performance by adjusting the size of the retransmitted payload in each retransmission. How to adjust the size of the retransmitted payload in each retransmission of the HARQ scheme including the type-II or the type-III such that a better performance is achieved is a topic for discussion.

SUMMARY OF THE INVENTION

The disclosure therefore provides a method and related communication device for handling a damage information-assisted HARQ scheme to solve the abovementioned problems.

A method of handling a retransmission of a hybrid automatic repeat request (HARQ) scheme for a receiver in a communication system is disclosed. The method comprises receiving a first payload from a transmitter in the communication system, and feeding back a resource index to the transmitter, to indicate a size for a second payload in the next reception, when the receiver is unsuccessful to decode the first payload into a plurality of information bits, wherein the transmitter encodes the plurality of information bits into the first payload by using an error correction code (ECC).

A method of handling a retransmission of a hybrid automatic repeat request (HARQ) scheme for a transmitter in a communication system is disclosed. The method comprises receiving a resource index from a receiver, wherein the resource index indicates a size for a payload, encoding a plurality of information bits into the payload with the size by using an error correction code (ECC), and transmitting the payload to the receiver in the communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
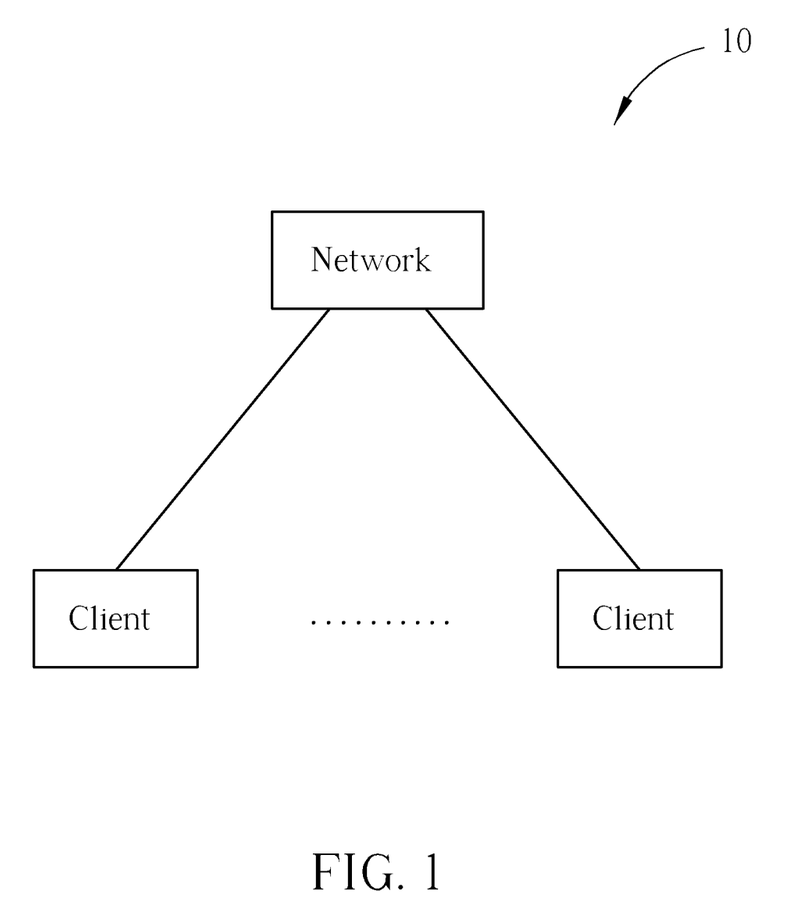
FIG. 1 is a schematic diagram of an exemplary communication system according to the present invention.

Please refer to FIG. 1, which is a schematic diagram of a communication system 10 according to an example of the present invention. The communication system 10 is briefly composed of a network and a plurality of clients. In FIG. 1, the network and the clients are simply utilized for illustrating the structure of the communication system 10. Practically, the network can be an E-UTRAN (evolved-UTRAN) comprising a plurality of evolved Node-Bs (eNBs) and relays in a long term evolution-advanced (LTE-A) system or an access point (AP) conforming to IEEE 802.11 standard in a wireless communication system, or can be a switch center of an Asymmetric Digital Subscriber Line (ADSL) in a wireline communication system, and is not limited herein. The clients can be mobile phones, laptops, tablet computers, electronic books and portable computer systems. Besides, the network and the client can be seen as a transmitter or receiver according to transmission direction, e.g., for an uplink (UL), the client is the transmitter and the network is the receiver, and for a downlink (DL), the network is the transmitter and the client is the receiver.

Figure 2:
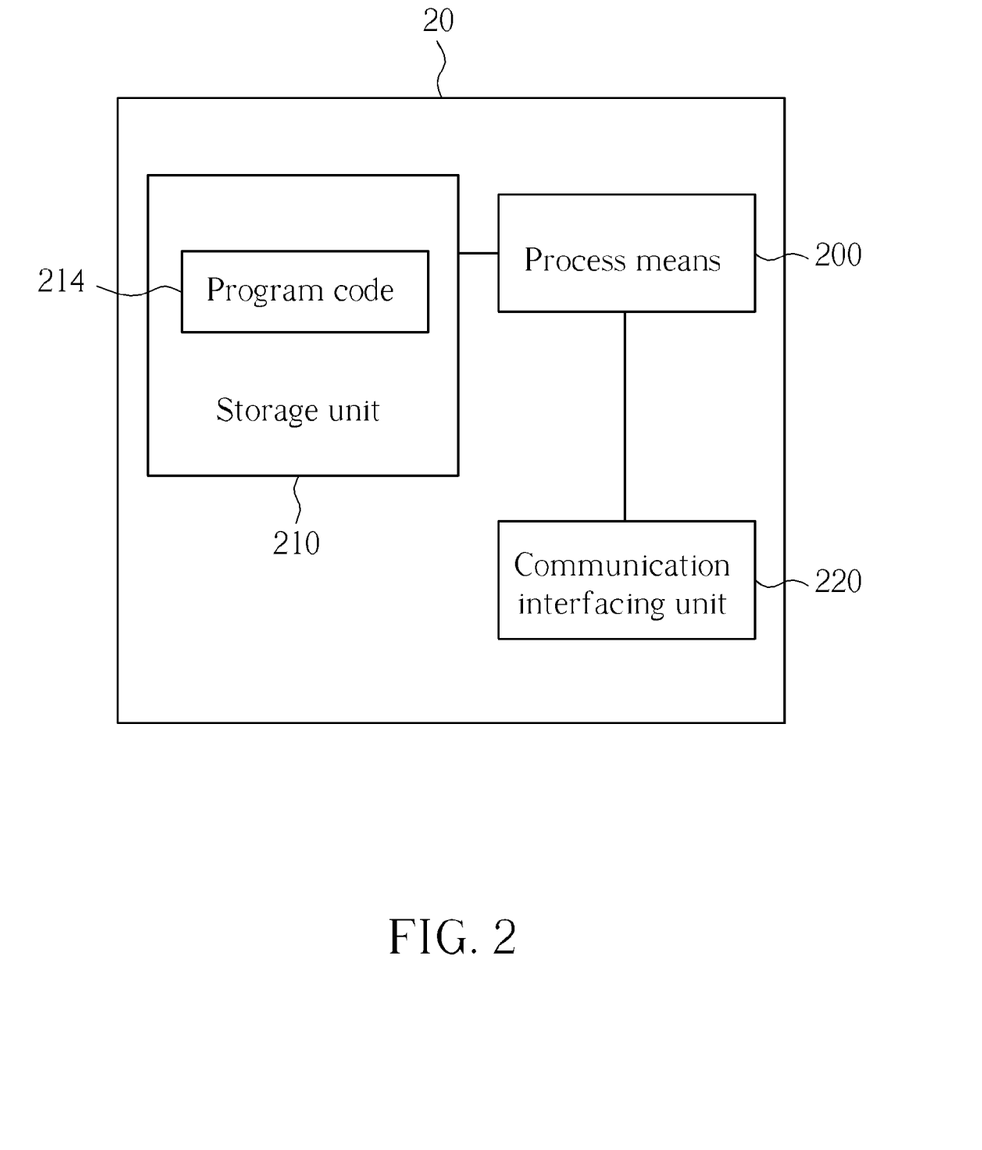
FIG. 2 is a schematic diagram of an exemplary communication device according to the present invention.

Please refer to FIG. 2, which is a schematic diagram of a communication device 20 according to an example of the present invention. The communication device 20 can be the client or the network shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed and executed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals according to processing results of the processor 200.

Figure 3:
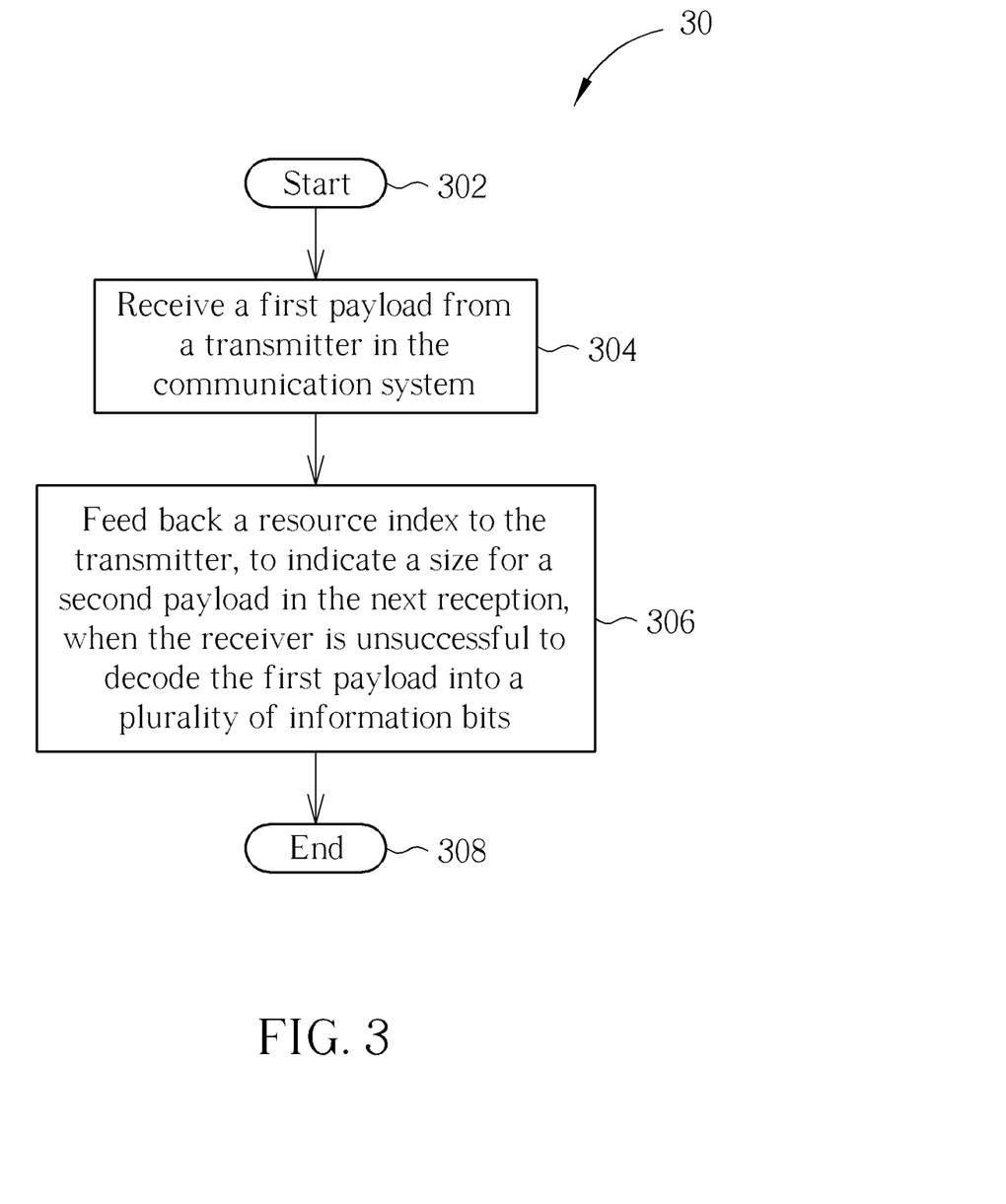
FIG. 3 is a flowchart of an exemplary process according to the present invention.

Please refer to FIG. 3, which is a flowchart of a process 30 according to an example of the present invention. The process 30 is utilized in a receiver of the communication system 10 shown in FIG. 1, to handle a retransmission of a HARQ scheme. The process 30 may be compiled into the program code 214 and includes the following steps:

Step 302: Start.

Step 304: Receive a first payload from a transmitter in the communication system.

Step 306: Feedback a resource index to the transmitter, to indicate a size for a second payload in the next reception, when the receiver is unsuccessful to decode the first payload into a plurality of information bits.

Step 308: End.

A plurality of information bits are encoded into the first payload by a corresponding transmitter by using an error correction code (ECC), and the first payload is transmitted to the receiver. According to the process 30, after receiving the first payload, the receiver decodes the first payload into a plurality of decoded bits by using the ECC. Under an assumption that the transmitter also uses an error detection code (EDC) to encode the plurality of information bits, the receiver can check whether the plurality of decoded bits are correct, i.e., the same as the plurality of information bits. If there is an error in the plurality of decoded bits, the receiver feedbacks the resource index which can be referred to as a negative acknowledgment (NACK) to indicate the size for the second payload. Then, the transmitter encodes all or part of the plurality of information bits into the second payload according to the resource index, for the next reception of the receiver. The process 30 continues until the receiver obtains the plurality of information bits.

As a result, the transmitter adaptively adjusts the size of a payload to be retransmitted according to a requirement of the receiver, and resources can be used efficiently in the HARQ scheme. Please note that, the resource index is used to indicate the transmitter to adjust the size of the payload to be retransmitted according to the requirement of the receiver, and methods of generating the resource index and contents included in the resource index are not limited herein. For example, the receiver can generate the resource index by using damage information which is related to information (e.g. severity and/or amount) of the error in the plurality of decoded bits, and such damage information is generated when decoding the first payload or jointly decoding the first payload and successive retransmitted payloads. Alternatively, the receiver can combine the damage information and quality information of the channel between the transmitter and the receiver to generate the resource index.

Figure 4:
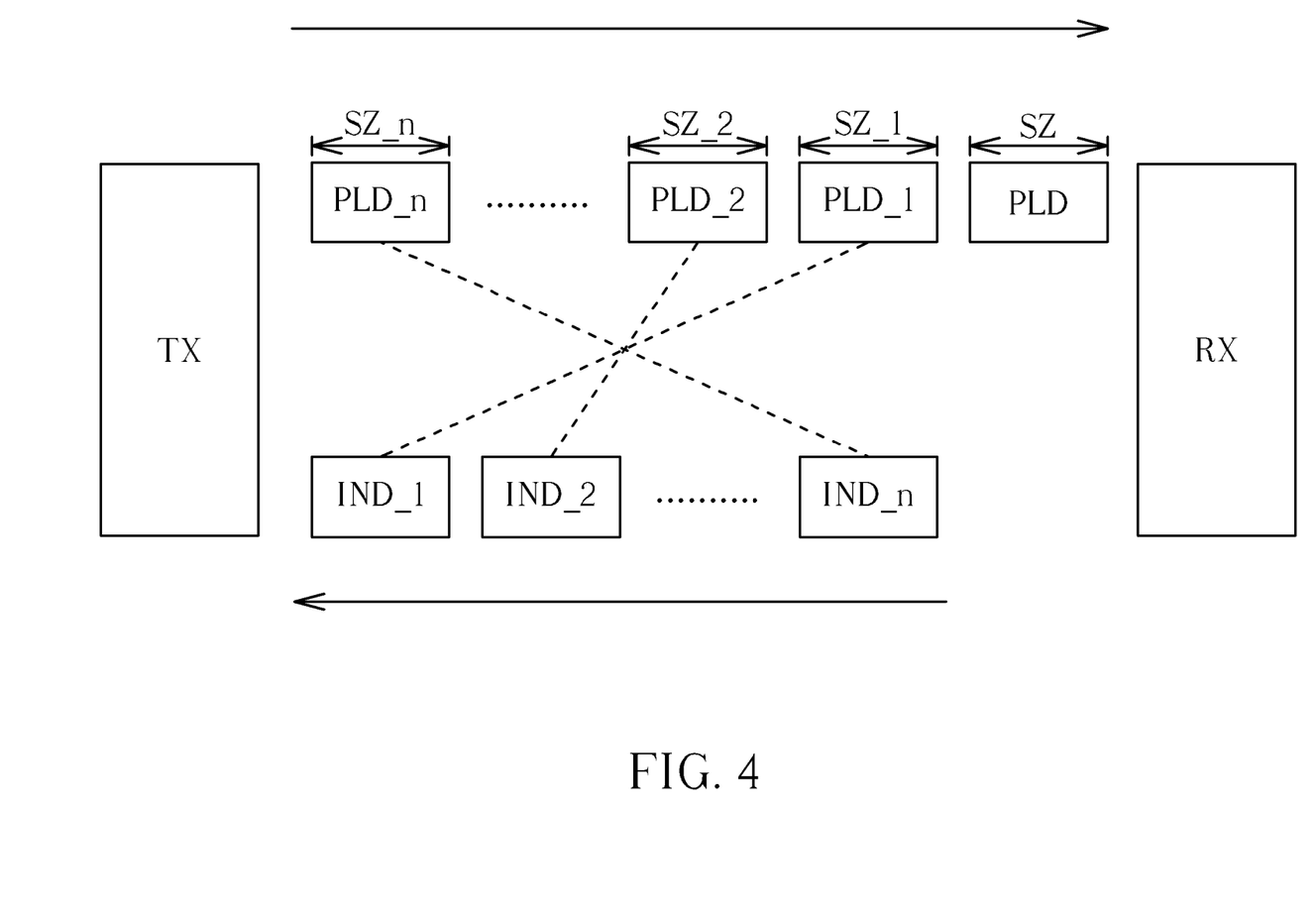
FIG. 4 is a schematic diagram of a transmitter and receiver communicating with each other according to an example of the present invention.

For further illustrating the present invention, please refer to FIG. 4, which is a schematic diagram of a transmitter and receiver communicating with each other according to an example of the present invention. The transmitter TX and the receiver RX can be realized in the communication device 20 shown in FIG. 2. The transmitter TX and the receiver RX operate according to the process 30. A payload PLD with a size SZ is first transmitted by the transmitter TX to the receiver RX. Payloads PLD_1-PLD_n are successive retransmissions for the payload PLD, when the payload PLD is not decoded successfully by the receiver RX. In this situation, the receiver feedbacks resource indices IND_1-IND_n to the transmitter TX to indicate sizes SZ_1-SZ_n for the payloads PLD_1-PLD_n, respectively.

In detail, the transmitter TX uses an ECC and an EDC to encode information bits into the payload PLD. Then, the transmitter TX transmits the payload PLD to the receiver RX. After receiving the payload PLD, the receiver RX decodes the payload PLD into decoded bits, and the EDC is used to check the correctness of the decoded bits. If the decoded bits are correct, the receiver feedbacks an ACK to inform the transmitter TX to transmit another new payload, and a retransmission is not needed. Otherwise, the receiver RX extracts damage information generated during decoding, and uses the damage information to generate the resource index IND_1. Alternatively, the receiver RX combines the damage information and quality information of a channel between the transmitter TX and the receiver RX to generate the resource index IND_1. The receiver RX feedbacks the resource index IND_1 to the transmitter TX to indicate the size SZ_1 for the retransmission of the payload PLD_1.

Please note that, the ECC can be a turbo code, a low-density parity-check (LDPC) code, a convolutional code or any code providing forward error correction, and is not limited herein. The EDC is used to check if there is an error in the decoded bits, and is preferably a CRC. The damage information can be any information (e.g. severity and/or amount) of the error of the decoded bits, and is not limited herein. Preferably, the damage information can be a function of soft output values generated by the receiver RX when decoding the payload PLD. The soft output values, such as log likelihood ratios (LLRs), are byproducts when the receiver RX uses an iterative decoding of at least one iteration to decode the payload PLD. Therefore, it does not need to obtain the damage information by additional computations. Besides, since the soft output values are generated in each iteration, the receiver RX can adopt all or part of the soft output values as contributed soft output values for the function. For example, only the soft output values at the last iteration are adopted as the contributed soft output values, since those are the most reliable soft out values comparing to the soft output values generated in previous iterations.

Figure 5:
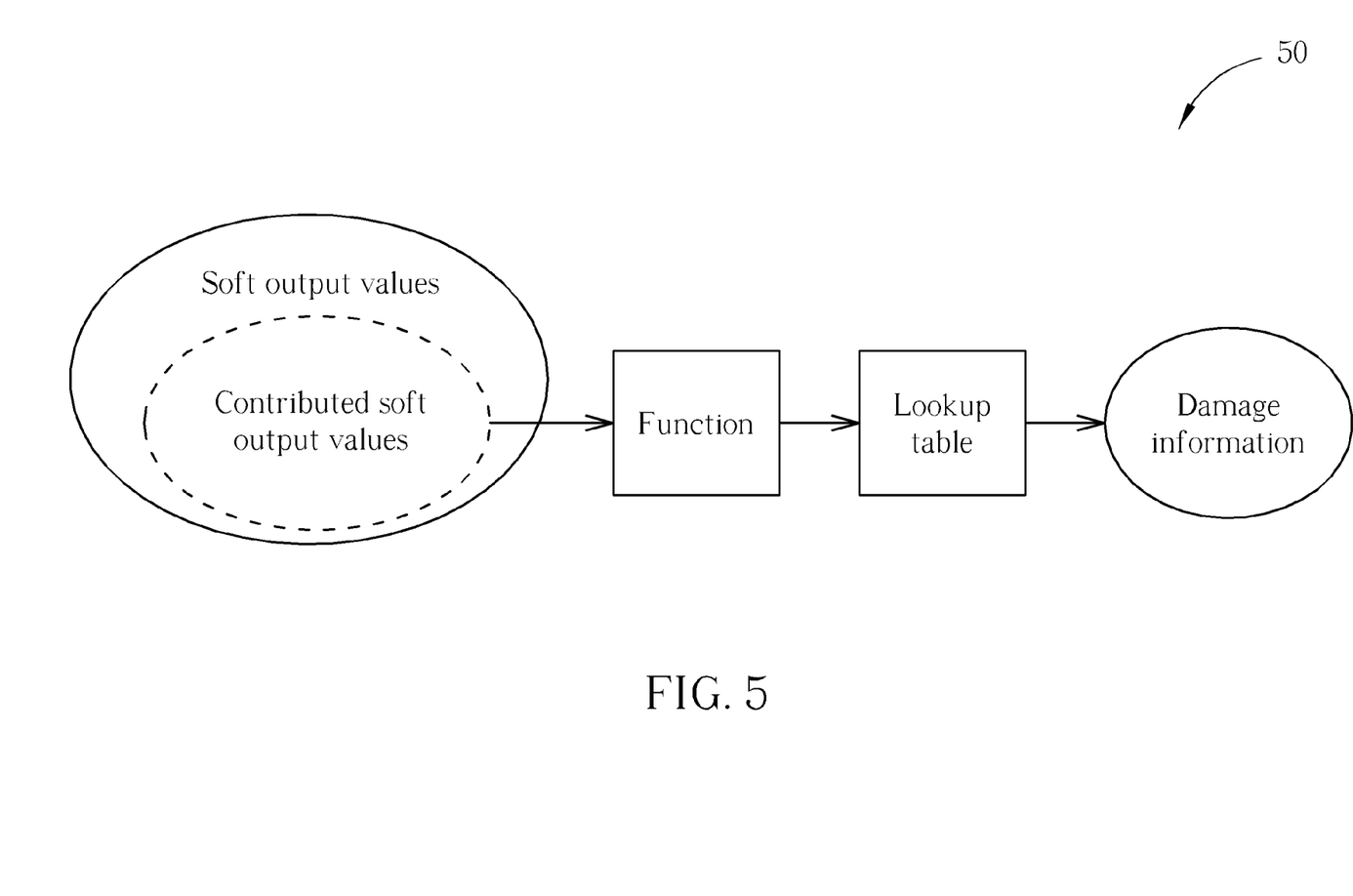
FIG. 5 is a flowchart of an exemplary process for generating the damage information according to an example of the present invention.

On the other hand, the function can be any transformation method capable of transforming the contributed soft output values into the damage information that can represent the severity of the error of the decoded bits, and is not limited herein. For example, the function outputs a percentile of a cumulative distribution function (CDF) of the contributed soft output values. The percentile can be an nth percentile below which is n % of the contributed soft output values. Therefore, the lower the percentile is, the more the severity of the error of decoded bits is. A value of the n % can be 5%, 10%, 20%, etc., and is not limited herein. Another example of the function is an average of a plurality of the contributed soft output values. Preferably, the plurality of the contributed soft output values can be the contributed soft output values lower than a percentile of the CDF of the plurality of the contributed soft output values. In other words, only the contributed soft output values lower than the percentile are averaged to obtain the damage information. Furthermore, since range of the damage information is wide and arbitrary, a lookup table including only a finite number of values can be used to limit the range of the damage information. More specifically, instead of using an output of the function as the damage information, the output of the function is mapped to one of the finite number of values in the lookup table. The one of the finite number of values is then used as the damage information to reduce complexity required for successive processing of the damage information. The lookup table is established by using a plurality of numerical experiments, and is preferably stored in the receiver RX. Therefore, the above illustration can be summarized into FIG. 5, which is a flowchart 50 for generating the damage information according to an example of the present invention.

Besides, the quality information of the channel between the transmitter TX and the receiver RX can be estimated by the receiver RX, or is obtained from another component of the communication device 20. As a result, the receiver RX can generate the resource index IND_1 by using the damage information and the quality information of the channel between the transmitter TX and the receiver RX.

After the transmitter TX receives the resource index IND_1 indicating the size SZ_1 for the payload PLD_1, the transmitter TX encodes part or all of the information bits into the payload PLD_1. In detail, the transmitter TX selects a combination of a coding rate of the ECC, a puncturing rule, a modulation format and a resource block allocation according to the resource index IND_1, to generate the payload PLD_1 with the size SZ_1, and transmits the payload PLD_1 to the receiver RX. An example of adjusting the coding rate simply is that increasing the coding rate if the resource index IND_1 is above a predefined threshold, otherwise reducing the coding rate.

After receiving the payload PLD_1, the receiver RX combines the payloads PLD and PLD_1 to perform a joint decoding. If the decoded bits are correct, the receiver RX feedbacks the ACK to inform the transmitter TX to transmit another new payload. Otherwise, the resource index IND_2 is generated according to the above illustration and is fed back to indicate the size SZ_2 for the retransmission of the payload PLD_2. If the information bits cannot be obtained by the receiver RX after performing the joint decoding of the payloads PLD, PLD_1 and PLD_2, the receiver RX continues feeding back the resource indices IND_3-IND_n to indicate retransmissions of the payloads PLD_3-PLD_n until the information bits are obtained by the receiver RX. When more retransmitted payloads are received and jointly decoded, there is a higher probability for the receiver RX to obtain the information bits.

In short, if the damage information implies that the receiver RX may only need a few more information (e.g. redundant bits and/or more information bits) to obtain the information bits, the receiver RX generates the resource index to indicate the transmitter TX to reduce a size of a payload to be retransmitted, and the transmitter TX transmits the payload with fewer resources. Oppositely, if the damage information implies that the receiver RX may need much more information to obtain the information bits, the receiver RX generates the resource index to indicate the transmitter TX to increase the size of the payload to be retransmitted, and the transmitter TX transmits the payload with more resources. In either way, the transmitter TX transmits the payload with enough information for a successful decoding according to the resource index, the receiver RX can obtain the information bits with just one retransmission or a few retransmissions. In this situation, not only the resources are preserved, but a delay caused by the HARQ scheme is reduced due to the one or a few retransmissions.

In comparison, a receiver according to the prior art receives each payload with a fixed size in each retransmission. The resources used are excessive when only a little more information is needed by the receiver, and are insufficient when the much more information are needed by the receiver. Not only the resources are wasted, but the delay caused by the HARQ scheme is increased due to more retransmissions. Therefore, throughput of the communication system is decreased.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides a method for handling a HARQ scheme in a communication system. When a receiver requests a retransmission of a payload, a transmitter adaptively adjusts a size of the payload according to an indication from the receiver. The indication relates to amount of information required by the receiver to decode the payload successfully, and is generated by using damage information and possibly quality information of a channel between the transmitter and the receiver. The method not only preserves resources required for the retransmission, but only a few retransmissions are required by the receiver to decode the payload successfully. Therefore, not only throughput of the communication system is increased, but a delay caused by the HARQ scheme is reduced due to the few retransmissions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a retransmission of a hybrid automatic repeat request (HARQ) scheme for a receiver in a communication system, the method comprising:

receiving a first payload from a transmitter in the communication system; generating a resource index by using damage information of the first payload and quality information of a channel between the transmitter and the receiver; and feeding back the resource index to the transmitter, to indicate a size for a second payload in the next reception, when the receiver is unsuccessful to decode the first payload into a plurality of information bits; wherein the transmitter encodes the plurality of information bits into the first payload by using an error correction code (ECC);

wherein the damage information is a function of a first plurality of soft output values of the first payload generated by the receiver when decoding the first payload, and the first plurality of soft output values of the first payload are part of soft output values generated by the receiver when decoding the first payload, and the part of the soft output values are generated by the receiver at the last iteration when a iterative decoding is used to decode the first payload.

2. The method of claim 1, wherein the damage information is a percentile of a cumulative distribution function (CDF) of the first plurality of soft output values of the first payload.

3. The method of claim 1, wherein the damage information is an average of a second plurality of soft output values of the first payload, wherein the second plurality of soft output values of the first payload are soft output values lower than a percentile of the CDF of the first plurality of soft output values of the first payload.

4. The method of claim 1 further comprising:
mapping the damage information into one of a plurality of discrete values by using a lookup table.

5. The method of claim 4, wherein the lookup table is established by using a plurality of numerical experiments.

6. The method of claim 1, wherein the quality information of the channel between the transmitter and the receiver is obtained or estimated by the receiver.

7. The method of claim 1, wherein the ECC is a turbo code, a low-density parity-check (LDPC) code or a convolutional code.

* * * * *

UNITED STATES PATENT AND TRADEMARK OFFICE
CERTIFICATE OF CORRECTION

| | | |
|---|---|---|
| PATENT NO. | : 8,812,924 B2 | Page 1 of 1 |
| APPLICATION NO. | : 13/165781 | |
| DATED | : August 19, 2014 | |
| INVENTOR(S) | : Ping-Cheng Yeh et al. | |

It is certified that error appears in the above-identified patent and that said Letters Patent is hereby corrected as shown below:

On the title page under item (12), delete "Jen et al." and insert -- Yeh et al. --.

On the title page, item (75), correct the order of the names of the inventors from "Yu-Chih Jen, Ping-Cheng Yeh, Chih-Yao Wu, Pang-Chang Lan, Ling-San Meng" to -- Ping-Cheng Yeh, Chih-Yao Wu, Pang-Chang Lan, Ling-San Meng, Yu-Chih Jen --.

Signed and Sealed this
Eighteenth Day of November, 2014

Michelle K. Lee
*Deputy Director of the United States Patent and Trademark Office*